Patented Nov. 11, 1924.

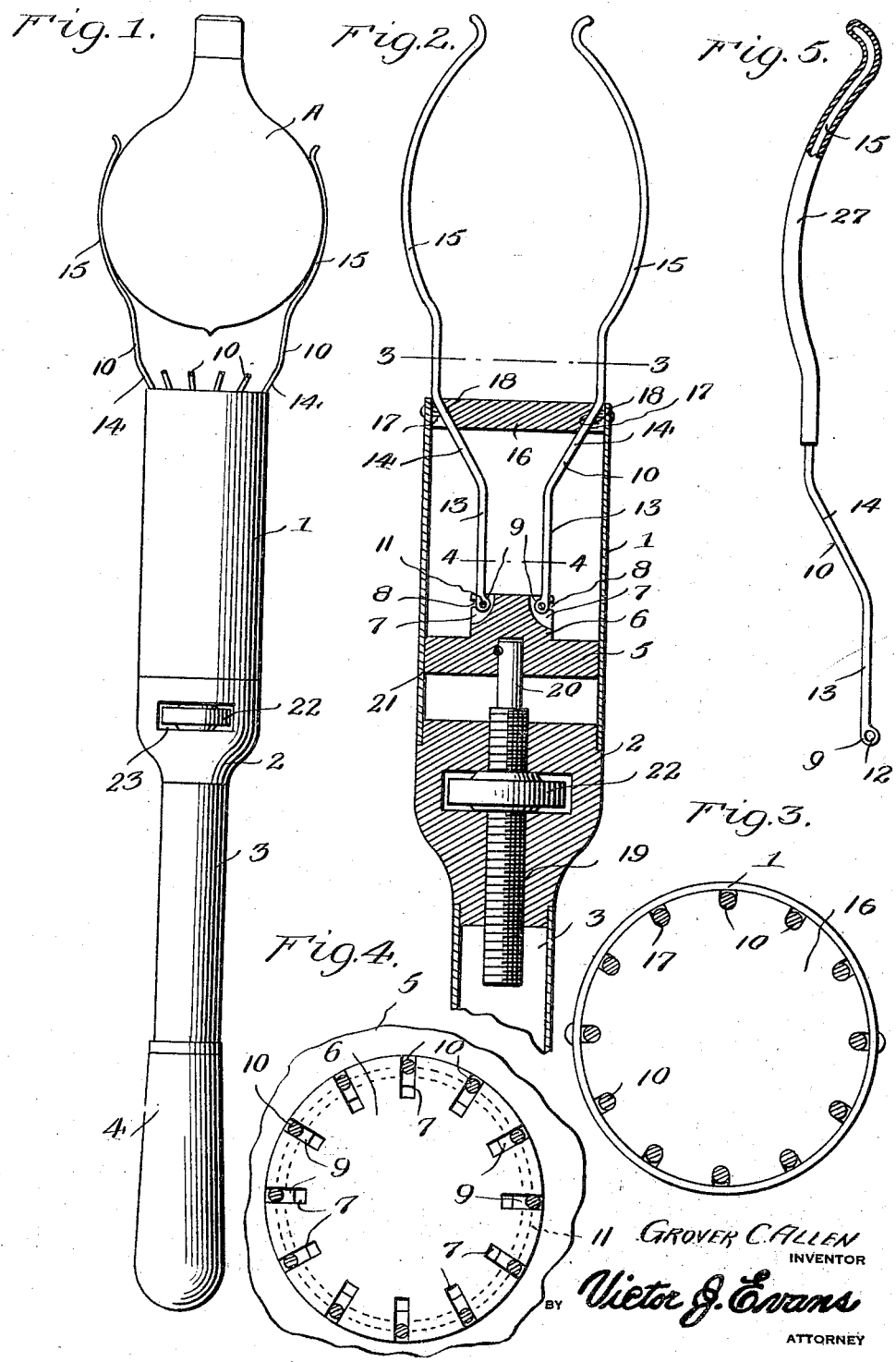

1,514,814

UNITED STATES PATENT OFFICE.

GROVER C. ALLEN, OF DETROIT, MICHIGAN.

ELECTRIC-BULB HOLDER.

Application filed March 18, 1921. Serial No. 453,222.

*To all whom it may concern:*

Be it known that I, GROVER C. ALLEN, a citizen of the United States, residing at Detroit, in the county of Wayne and State of Michigan, have invented new and useful Improvements in Electric-Bulb Holders, of which the following is a specification.

This invention relates to holders particularly designed for use in replacing incandescent light bulbs in their sockets when they are out of reach and an object of the invention is to provide a device of this nature which embodies a plurality of bulb engaging arms pivotally connected to a slidable member slidable within a cylindrical housing or handle and through the openings in a spreader plate which, upon outward movement of the movable member causes the bulb gripping arms to spread and upon inward movement of the sliding arms to move inwardly or collapse for gripping a light bulb or analogous structure to permit unscrewing of a bulb from or screwing of a bulb into a socket.

A further object of this invention is to provide resilient gripping covers for the arms to provide cushioning gripping engagement of the arms with a light bulb or analogous structure.

Other objects of the invention will appear in the following detailed description and in the accompanying drawings wherein:

Fig. 1 is a side elevation of the improved holder illustrating the arms in gripping position and having part of the holder broken away.

Fig. 2 is a longitudinal section through the holder.

Fig. 3 is a detailed cross section through the holder taken on the line 3—3 of Fig. 1.

Fig. 4 is a detailed cross section taken on the line 4—4 of Fig. 1.

Fig. 5 is an enlarged detailed view, partly in section, of one of the bulb gripping arms of the holder.

Referring more particularly to the drawing the improved holder comprises a cylindrical housing 1, one end of which is attached to a suitable body member 2, which is attached to a handle 3. The handle 3 may have a hand grip 4 on its end remote from the housing 1. The cylindrical housing 1 is hollow and has a slidable arm carrying member 5 slidably mounted therein and fitted within the housing to permit free sliding movement thereof but to prevent lateral movement. The slidable member 5 includes a substantially cylindrical reduced portion 6 which is provided with a plurality of circumferentially spaced cutout portions 7 opening out through the side and outer end of the reduced portion 6 as clearly shown in Fig. 2 of the drawing, and also with a laterally opening circumferential portion 8. The cutout portions 7 receive therein the perforated ends 9 of the gripping arms 10 and a binding pin 11 is inserted through the openings 12 in the ends 9 of the arms 10 to the slidable member 5. The arms 10 comprise relatively straight portions 13 which extend outwardly from their perforated portions 9 and outwardly angled portions 14 which connect the straight portions 13 with the curved bulb engaging portions 15 of the arms and which, when the holder is assembled, incline outwardly as clearly shown in Fig. 1 of the drawing co-operating with the spreader disc 16. The spreader disc 16 is rigidly attached in the outer open end of the cylindrical casing 1 and is provided with a plurality of circumferentially spaced cutout portions 17, one for each of the arms 10. The cutout portions 17 incline inwardly towards the axis of the spreader disc 16 as clearly shown in Fig. 2 of the drawing and corresponding to the angles of the angled portions 14 of the arms 10, so that when the slidable member 5 is forced outwardly the angled portions 14 of the arms 10 will pass over the inclined inner edges 18 of the cutout portions 17 and when the straight portions 13 engage these inclined edges, the arms 10 will be rocked upon their pivot and spread to facilitate their mounting about a light bulb as shown at A in Fig. 1 of the drawing. When the slidable member 15 is moved inwardly the straight portions 13 riding over the inclined surfaces 18 and the angled portions 14 engaging the inclined surfaces 18 will move the arms inwardly toward the axis of the casing 1 constricting the space within the arms, as illustrated in Fig. 2 of the drawing to permit the device to be stored in a relatively small space or to allow the arms to be collapsed until they properly engage the bulb A to permit the turning of the bulb.

A feed screw 19 is provided with a reduced nut 20 which is connected to the slidable member 5 in any suitable manner such as by a locking pin 21.

The feed screw 19 extends through the body member 2 and it has a thumb nut 22 mounted thereon intermediate its ends which thumb nut projects through a suitable opening 23 formed in the body member 2 so as to permit rotation of the thumb nut from the exterior of the body member for rotating the feed screw 19 and moving the member 5 either outwardly or inwardly in the casing 1. The thumb nut 22 is held against movement longitudinally of the feed screw 19 by the upper and lower walls of the opening 23 so that when the thumb nut is rotated the feed screw will be moved longitudinally for adjusting the slidable member 5. It is desirable to provide a relatively great pitch or angle to the threads of the feed screw 19 so as to permit relatively quick adjusting movement of the slidable member 5.

The bulb engaging portions 15 of the arms 10 are preferably covered with rubber stalls 27 which provide cushioning frictional gripping of the arms with a glass bulb A and prevent slipping of the arms relative to the bulb as well as prevent breaking of the bulb in case the arms are abruptly adjusted into bulb engaging position.

It is, of course, to be understood that this invention may be constructed in various other manners and the parts associated in different relations and, therefore, I do not desire to be limited in any manner except as set forth in the claim hereunto appended.

Having thus described my invention what I claim is:

A bulb holder comprising a handle, bulb gripping elements including a slidable carrying member, and means carried by the end portion of the handle engaging directly the end portion of said carrying member for giving movements thereto, said means including a manually operated feed screw having a stem projecting therefrom engaging the under portion of said carrying member.

In testimony whereof I affix my signature.

GROVER C. ALLEN.